Jan. 29, 1935. J. N. STRAUSS 1,989,116

OSCILLATING JOINT CONNECTION

Filed May 28, 1923

INVENTOR.
John N. Strauss
BY
Emery, Booth, Janney & Varney
ATTORNEYS.

Patented Jan. 29, 1935

1,989,116

UNITED STATES PATENT OFFICE 1,989,116

OSCILLATING JOINT CONNECTION

John N. Strauss, Buffalo, N. Y., assignor to Morgan, Blodgett, Morgan, Inc., New York, N. Y., a corporation of New York Application May 28, 1928, Serial No. 281,020

7 Claims. (Cl. 287—90)

This invention relates to oscillating joint connections for relatively movable parts such, for example, as are commonly used in automobiles to connect parts of the steering mechanism or to connect a shock absorber with a vehicle axle.

It is an object of the invention to provide a connection which shall be rugged and durable, which shall require no lubrication, and which shall maintain a tight connection, without lost motion, over long periods of time without adjustment.

Other objects and advantages of the invention will appear hereinafter.

Figure 1:
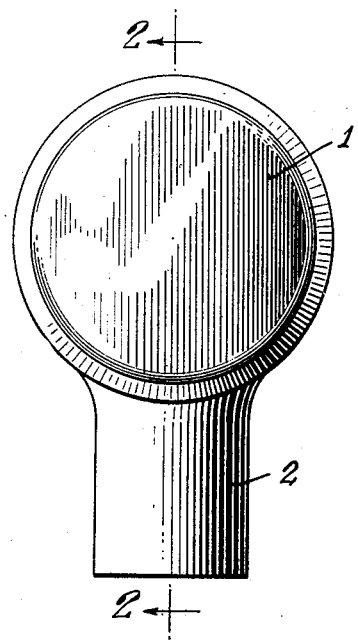
Figure 2:
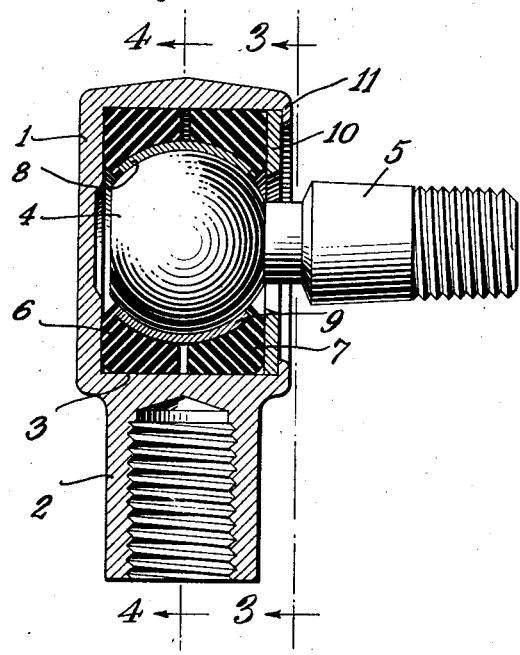

A preferred embodiment of the invention selected for purposes of illustration is shown in the accompanying drawing, in which, Fig. 1 is a side elevation of one face of the connection;

Fig. 2 is a section on the line 2—2 of Fig. 1; and

Figure 3:
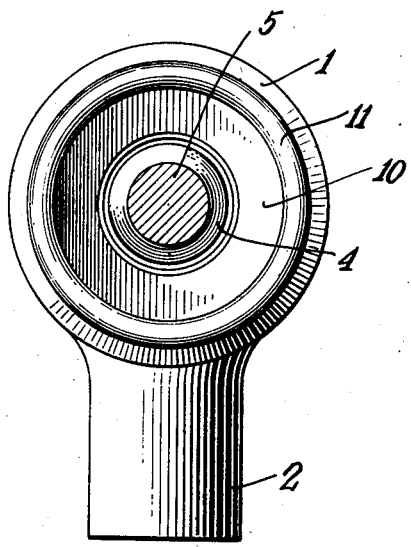
Figure 4:
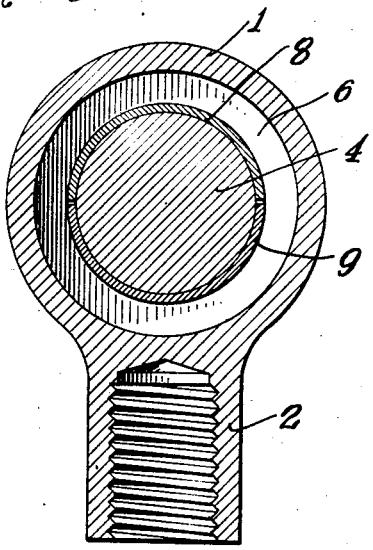

Figs. 3 and 4 are sections on the lines 3—3 and 4—4 respectively, of Fig. 2.

Referring to the drawing, the connection comprises a housing 1 having a shank 2, which may be threaded or otherwise formed for connection to a rod or other part. The housing has a cavity 3 formed therein which receives the ball 4 having a shank 5 also threaded or otherwise formed for connection to a rod or other part.

Also located within the cavity 3 between the walls of the cavity and the ball 4 is a resilient packing, preferably of rubber comprising preferably a pair of similar rubber rings 6 and 7 having their interior surfaces shaped generally to fit the ball 4. As illustrated, the said rings preferably lie in planes which are perpendicular to the normal axis of the shank 5.

Located between the rubber packing rings and the ball, and bridging the space (if any) between said rings is an anti-friction or self-lubricating liner, preferably of metal such as graphited bronze, said liner preferably comprising two similar segments 8 and 9, having abutting edges spaced apart somewhat as illustrated.

The rubber packing rings 6 and 7 are preferably maintained under pressure within the housing, the closure plate 10 being provided to fit within the open side of the cavity, and being pressed against the packing in such manner as to maintain moderate pressure thereon. The said plate 10 may be maintained in proper position by rolling the edge of the flange 11.

As will be observed, in an oscillating joint of this construction the relatively moving parts are cushioned by the resilient packing against either thrust or pull which may be applied thereto in any direction, so that the shock of suddenly applied force may be eased somewhat. Furthermore, by reason of the pressure applied to the packing, as wear occurs the resilient packing expands so that a tight joint without lost motion is maintained at all times.

It will be understood that the invention may be variously modified and embodied within the scope of the subjoined claims.

I claim as my invention:

1. In a device of the character described, the combination of a socket member provided with a recess having one open side, a rod extending through such opening and having a spherical end, two semi-spherical, self-lubricating bearing elements disposed about said end, and compressible material disposed in such recess about such spherical elements, and means for reducing the size of said opening and for compressing said material against the walls of the socket.

2. In a device of the character described, the combination of a socket member provided with a recess having one open side, a rod extending through the opening in said side and having a spherical end, two semi-spherical, self-lubricating bearing elements disposed about said spherical end, and yielding rubber filling blocks disposed in such recess about such bearing elements and filling the space therebetween, and means for reducing the area of the opening of said side and for maintaining said blocks under compression within said recess.

3. In an oscillating joint, in combination, a housing, a ball extending into said housing, a plurality of packing rings of resilient material forming a socket for said ball and spaced therefrom, and anti-friction lining between said ball and packing and bridging the space between the adjacent rings, said lining comprising a pair of metallic segments having abutting edges.

4. In a joint, in combination, an element having an enlarged spherical portion; a housing having an opening through a wall thereof and comprising a socket, said opening being sufficiently large to allow said spherical portion to be inserted therethrough into said socket; compressible material disposed within said housing and about the spherical portion located in said socket; and means for reducing the area of said opening to prevent the withdrawing of said spherical portion from said socket, and for permanently compressing the compressible material.

5. In an oscillating joint, in combination, an element having an enlarged spherical portion; a housing formed in one piece and having an opening through a wall thereof, said opening being sufficiently large to allow said spherical portion to be inserted into said housing; a mass of rubber composition disposed within said housing and about the said spherical portion; means coacting with the said wall of said housing to reduce the area of said opening to prevent the withdrawing of said spherical portion from said housing, and for permanently compressing said rubber composition the dimensions of the rubber composition and the internal dimensions of said housing being such as to permit flow of the rubber when compressed.

6. In a joint, in combination, a housing having a circular interior cross-section, resilient deformable bearing supporting means in said housing having supporting surfaces provided with circular cross-sections, a bearing member having circular cross-sections mounted in said supporting means, said parts being so arranged that the axis of said bearing member is substantially parallel with the axes of the circular cross-section of the supporting means.

7. In a joint, in combination, a housing, a resilient deformable bearing support in said housing having a spherically shaped supporting surface, and a spherically shaped bearing member mounted in said supporting means whereby forces exerted by said bearing member are transmitted to said housing in a plurality of diverging components.

JOHN N. STRAUSS.